(12) United States Patent
Yang et al.

(10) Patent No.: US 12,009,985 B2
(45) Date of Patent: Jun. 11, 2024

(54) NETWORK REACHABILITY IMPACT ANALYSIS

(71) Applicant: Google LLC, Mountain View, CA (US)

(72) Inventors: Hongkun Yang, San Jose, CA (US); Hui Liu, San Ramon, CA (US); Gargi Adhav, San Jose, CA (US); Alan Tang, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/804,389

(22) Filed: May 27, 2022

(65) Prior Publication Data
US 2022/0294699 A1    Sep. 15, 2022

Related U.S. Application Data

(63) Continuation of application No. 17/117,376, filed on Dec. 10, 2020, now Pat. No. 11,381,460.

(51) Int. Cl.
*H04L 41/12* (2022.01)
*H04L 41/082* (2022.01)
(Continued)

(52) U.S. Cl.
CPC ............ *H04L 41/12* (2013.01); *H04L 41/082* (2013.01); *H04L 41/0846* (2013.01); *H04L 41/085* (2013.01); *H04L 43/045* (2013.01)

(58) Field of Classification Search
None
See application file for complete search history.

(56) References Cited

U.S. PATENT DOCUMENTS

| 7,653,712 B1* | 1/2010 | Dubrovsky | H04L 41/0853 709/224 |
| 7,933,981 B1* | 4/2011 | Cannon, III | H04L 41/12 715/734 |

(Continued)

FOREIGN PATENT DOCUMENTS

WO    2018075982 A1    4/2018

OTHER PUBLICATIONS

International Search Report and Written Opinion for the related Application No. PCT/US2021/062818, dated Mar. 4, 2022, 15 pages.

*Primary Examiner* — Lance Leonard Barry
(74) *Attorney, Agent, or Firm* — Honigman LLP; Brett A. Krueger

(57) ABSTRACT

A method includes obtaining a stream of consecutive network configuration snapshots each including network configuration information. The method also includes determining that first network configuration information is the same as second network configuration information. After determining that the first network configuration information is the same as the second network configuration information, the method includes determining that the second network configuration information is not the same as third network configuration information. The method also includes determining a net change in reachability for a network based on a difference in packet reachability. The method also includes determining a policy violation based on the net change in reachability for the network and generating a reachability differentiation report including the policy violation. The method also includes reverting a configuration of the network to a state corresponding to the first network configuration information and implementing the network using the reverted configuration.

20 Claims, 6 Drawing Sheets

(51) Int. Cl.
*H04L 41/084* (2022.01)
*H04L 41/085* (2022.01)
*H04L 43/045* (2022.01)

(56) References Cited

U.S. PATENT DOCUMENTS

| | | | | |
|---|---|---|---|---|
| 9,117,073 | B1* | 8/2015 | Daue | H04L 63/18 |
| 9,450,817 | B1 | 9/2016 | Bahadur et al. | |
| 9,590,854 | B1* | 3/2017 | Shekhar | H04L 41/0894 |
| 9,830,345 | B1* | 11/2017 | Baars | G06F 16/2246 |
| 10,797,952 | B1* | 10/2020 | Mills | H04L 41/0859 |
| 10,990,385 | B1* | 4/2021 | Farhangi | G06F 11/1464 |
| 2009/0164716 | A1* | 6/2009 | Van Hise | G06F 3/0605 |
| | | | | 711/E12.001 |
| 2009/0222540 | A1* | 9/2009 | Mishra | H04L 41/5054 |
| | | | | 707/999.107 |
| 2009/0327854 | A1* | 12/2009 | Chhajer | G06F 16/217 |
| | | | | 715/227 |
| 2012/0066380 | A1* | 3/2012 | Gao | H04L 47/822 |
| | | | | 709/224 |
| 2013/0326616 | A1* | 12/2013 | Planck | H04L 63/1416 |
| | | | | 726/22 |
| 2016/0036636 | A1* | 2/2016 | Erickson | H04L 41/145 |
| | | | | 370/254 |
| 2018/0115469 | A1* | 4/2018 | Erickson | H04L 41/0853 |
| 2018/0173789 | A1* | 6/2018 | Llagostera | G06F 16/9024 |
| 2018/0337830 | A1 | 11/2018 | Padhye et al. | |
| 2018/0351845 | A1* | 12/2018 | Horn | H04L 43/50 |
| 2020/0028762 | A1* | 1/2020 | Sun | H04L 41/12 |
| 2020/0304390 | A1 | 9/2020 | Prasad et al. | |

* cited by examiner

NETWORK REACHABILITY IMPACT ANALYSIS

CROSS REFERENCE TO RELATED APPLICATIONS

This U.S. patent application is a continuation of, and claims priority under 35 U.S.C. § 120 from, U.S. patent application Ser. No. 17/117,376, filed on Dec. 10, 2020. The disclosure of this prior application is considered part of the disclosure of this application and is hereby incorporated by reference in its entirety.

TECHNICAL FIELD

This disclosure relates to reachability impact analysis of a cloud network.

BACKGROUND

A virtual private cloud (VPC) is an on-demand configurable pool of shared computing resources allocated within a public cloud environment. The VPC provides isolation for a user from other cloud users. The VPC may execute one or more virtual machines (VMs) which may communication with the user's on-premises network or other remote resources via a virtual private network (VPN). Due to the potential scale and complexity of the VPC, which may include any number of VMs, network gateways, load balancers, etc., significant network configuration is often necessary to operate and maintain the VPC.

SUMMARY

One aspect of the disclosure provides a method of network reachability impact analysis. The method includes receiving, at data processing hardware, a plurality of network configuration snapshots for a network. The method also includes selecting, by the data processing hardware, a first network configuration snapshot of the network and a second network configuration snapshot of the network. The method further includes generating, by the data processing hardware, a first reachability graph representing packet reachability of the network for the first network configuration snapshot. The method also includes generating, by the data processing hardware, a second reachability graph representing packet reachability of the network for the second network configuration snapshot. The method also includes computing, by the data processing hardware, a reachability differentiation graph identifying a net change to reachability from the first reachability graph to the second reachability graph. The method further includes generating, by the data processing hardware, a reachability differentiation report including a human-interpretable output of the net change to reachability.

Implementations of the disclosure may include one or more of the following optional features. In some implementations, generating the reachability differentiation report further includes translating, by the data processing hardware the reachability differentiation graph from a computer-interpretable format to the human-interpretable output. In some examples, each of the plurality of network configuration snapshots includes a data plane model protocol taken at a respective time instance. Here, selecting the first network configuration snapshot and the second network configuration snapshot may include comparing, by the data processing hardware, the data plane model protocols of consecutive network configuration snapshots Optionally, selecting the first network configuration snapshot and the second network configuration snapshot includes, when a first data plane model protocol of a first one of the consecutive network configuration snapshots is different than a second data plane model protocol of a second one of the consecutive network configuration snapshots, selecting, by the data processing hardware, the first one of one of the consecutive network configuration snapshots as the first network configuration snapshot and the second one of the consecutive network configuration snapshots as the second network configuration snapshot.

In some implementations, the method further includes computing, by the data processing hardware, one or more packet equivalence classes for the first network configuration snapshot and the second network configuration snapshot, each of the one or more packet equivalence classes including a set of packets having the same forwarding behavior. Optionally, the method further includes assigning, by the data processing hardware, the one or more packet equivalence classes to the first reachability graph, and assigning, by the data processing hardware, the one or more packet equivalence classes to the second reachability graph. In some examples, computing the reachability differentiation graph includes identifying a net change to network equivalence classes from the first reachability graph to the second reachability graph.

In some configurations, the method includes generating the first reachability graph and the second reachability graph includes generating, by the data processing hardware, a directed graph including two or more nodes and one or more edges connecting each of the two or more nodes. Here, generating the directed graph may include associating, by the data processing hardware, each of the two or more nodes to a network endpoint and associating each of the one or more edges to a network forwarding route from one network endpoint to another network endpoint.

Another aspect of the disclosure provides a system. The system includes data processing hardware and memory hardware in communication with the data processing hardware. The memory hardware stores instructions that when executed on the data processing hardware cause the data processing hardware to perform operations. One operation includes receiving a plurality of network configuration snapshots for a network. Another operation includes selecting a first network configuration snapshot of the network and a second network configuration snapshot of the network. The operations further include generating a first reachability graph representing packet reachability of the network for the first network configuration snapshot. Another operation includes generating a second reachability graph representing packet reachability of the network for the second network configuration snapshot. The operations further include computing a reachability differentiation graph identifying a net change to reachability from the first reachability graph to the second reachability graph, and generating a reachability differentiation report including a human-interpretable output of the net change to reachability.

This aspect of the disclosure may include one or more of the following optional features. In some examples, generating the reachability differentiation report further includes translating the reachability differentiation graph from a computer-interpretable format to the human-interpretable output. In some examples, each of the plurality of network configuration snapshots includes a data plane model protocol taken at a respective time instance. Here, selecting the first network configuration snapshot and the second network configuration snapshot may further include comparing the data plane model protocols of consecutive network configuration snapshots. Optionally, selecting the first network configuration snapshot and the second network configuration snapshot includes, when a first data plane model protocol of a first one of the consecutive network configuration snapshots is different than a second data plane model protocol of a second one of the consecutive network configuration snapshots, selecting the first one of one of the consecutive network configuration snapshots as the first network configuration snapshot and the second one of the consecutive network configuration snapshots as the second network configuration snapshot.

In some examples, the operations further include computing one or more packet equivalence classes for the first network configuration snapshot and the second network configuration snapshot, each of the one or more packet equivalence classes including a set of packets having the same forwarding behavior. Here, the operations further include assigning the one or more packet equivalence classes to the first reachability graph and assigning the one or more packet equivalence classes to the second reachability graph. Optionally, computing the reachability differentiation graph includes identifying a net change to network equivalence classes from the first reachability graph to the second reachability graph.

In some implementations, generating the first reachability graph and the second reachability graph includes generating a directed graph including two or more nodes and one or more edges connecting each of the two or more nodes. Here, generating the directed graph includes associating each of the two or more nodes to a network endpoint and associating each of the one or more edges to a network forwarding route from one network endpoint to another network endpoint.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A virtual private cloud (VPC) is an on-demand configurable pool of shared computing resources allocated within a public cloud environment to provide isolation for a user from other cloud users. This isolation may occur through allocation of private Internet Protocol (IP) subnets and/or virtual communication constructs. The VPC may execute one or more virtual machines (VMs) which may communication with the user's on-premises network or other remote resources via a virtual private network (VPN) to ensure secure access to the VPC environment. Because some VPC environments are very complex with a very large scale (i.e., include a number of VMs, network gateways, load balancers, etc.), significant network configuration is often necessary to operate and maintain the VPC.

Implementations herein are directed toward a cloud reachability impact analyzer that allows a user understand the impact that changes to the configuration of the network will have on packet reachability within the network. The cloud reachability impact analyzer generates directed graphs representing network reachability for two network configuration snapshots. The cloud reachability impact analyzer then performs a reachability analysis on the graphs to identify changes to reachability caused by the network configuration changes between the two network configuration snapshots. Thus, the cloud reachability impact analyzer allows the user to verify how a network configuration change will affect packet reachability relative to a previous network configuration.

Figure 1:
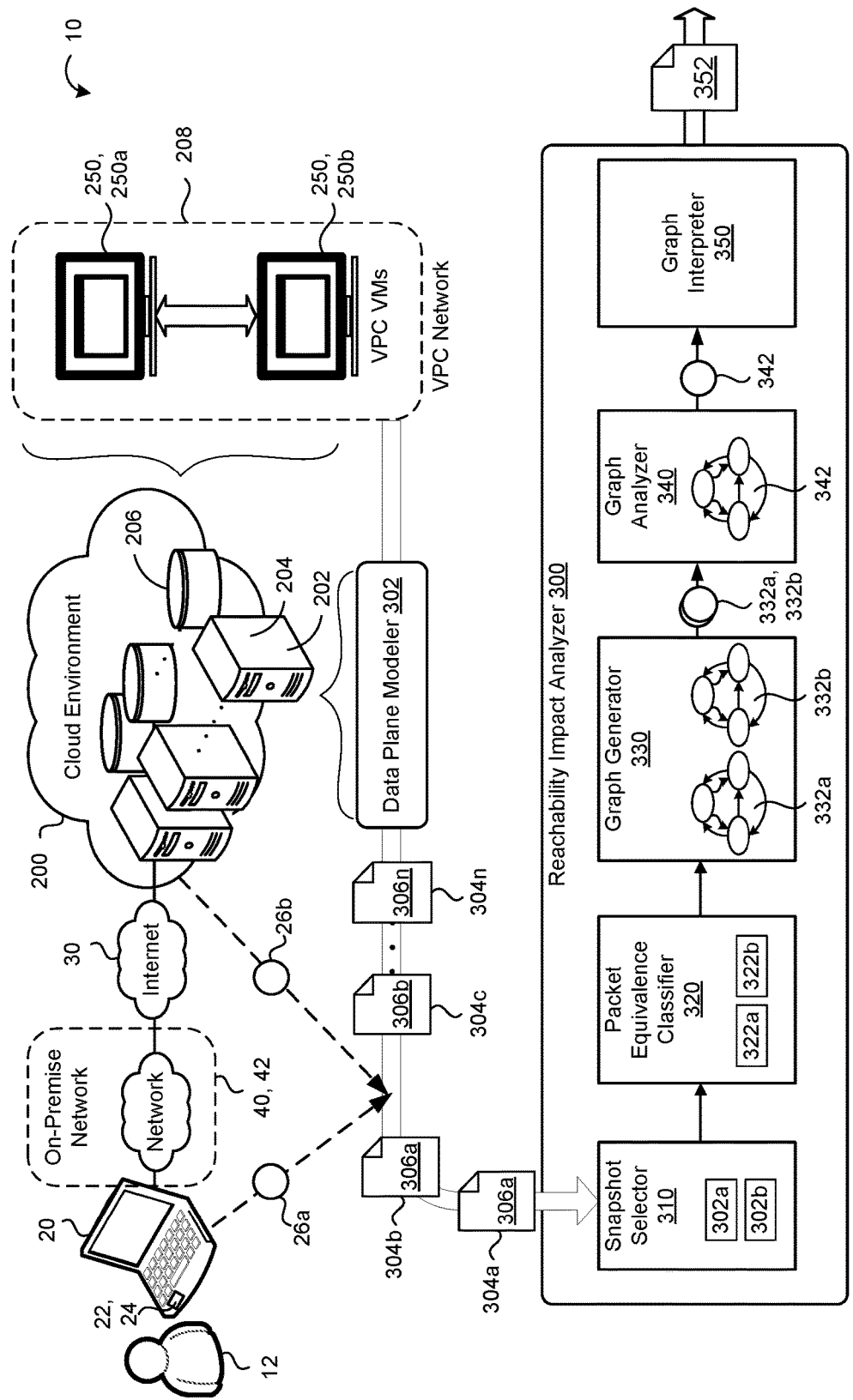
FIG. 1 is a schematic view of an example system for performing network reachability impact analysis.

Referring to FIG. 1, in some implementations, an example system 10 includes a user device 20 associated with a respective user 12 and in communication with a cloud network 200 via a network 30 (e.g., the Internet) and an on-premises network 40 (i.e., the local network that the user device 20 uses to connect to the network 30). The on-premises network 40 includes a network gateway 42 (e.g., a router) that serves as the forwarding host for the on-premises network 40. The user device 20 may correspond to any computing device, such as a desktop workstation, a laptop workstation, or a mobile device (e.g., a smart phone or tablet). The user device 20 includes computing resources 22 (e.g., data processing hardware) and/or storage resources 24 (e.g., memory hardware).

The cloud network 200 may be a single computer, multiple computers, or a distributed system (e.g., a cloud environment) having scalable/elastic resources 202 including computing resources 204 (e.g., data processing hardware) and/or storage resources 206 (e.g., memory hardware). A data store (i.e., a remote storage device) may be overlain on the storage resources 206 to allow scalable use of the storage resources 206 by one or more of the client or computing resources 204. The cloud network 200 is configured to implement and execute one or more virtual machines (VMs) 250, 250a—n. One or more of the VMs execute securely in a virtual private cloud (VPC) environment or VPC 208 associated with or operated by the user 12. The VPC 208 may include a variety of other network elements, such as load balancers, gateways, front ends, and back ends.

Figure 2:
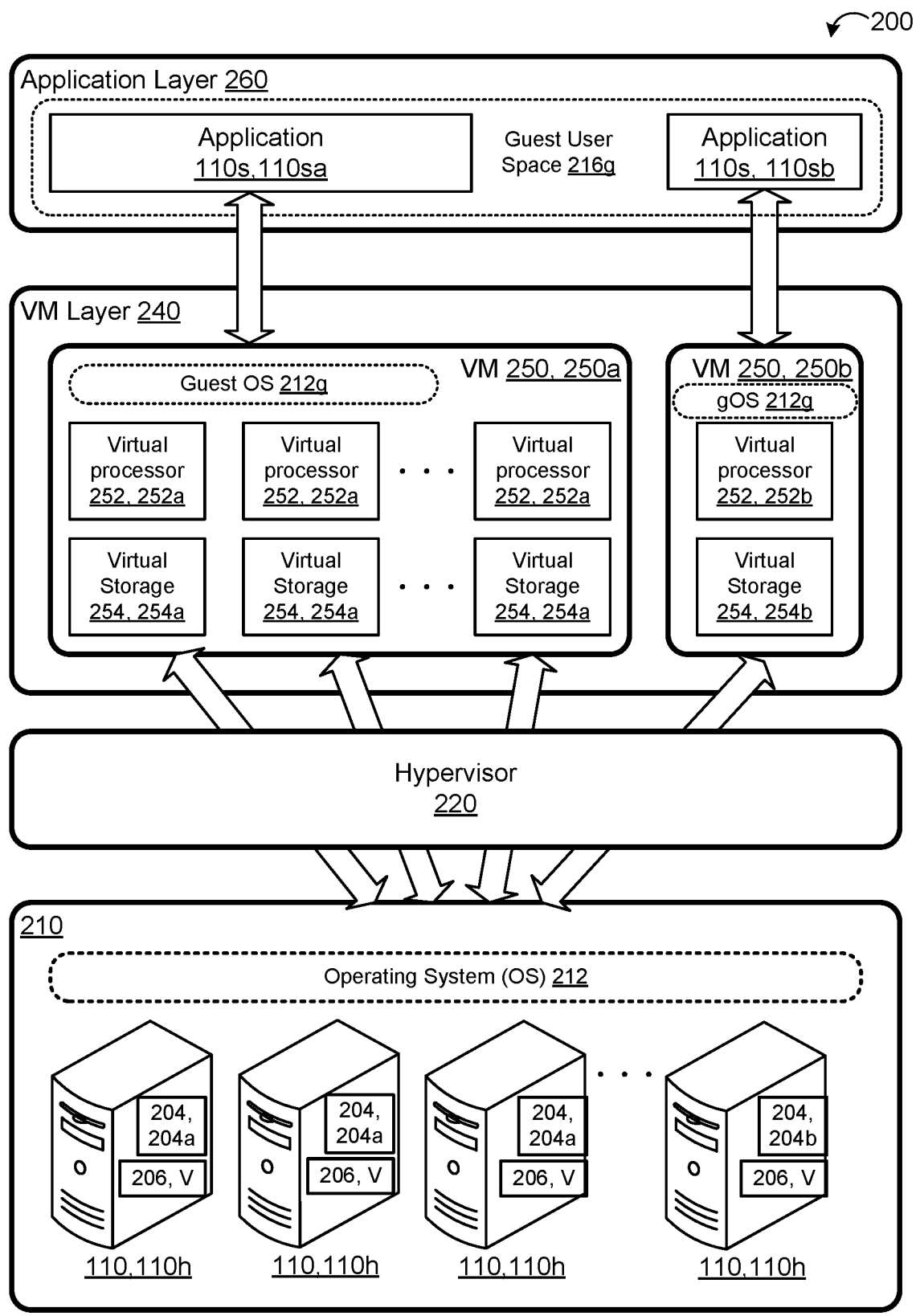
FIG. 2 is a schematic view of exemplary components of a virtual machine of the system of FIG. 1.

In the example shown in FIG. 2, the distributed system 200 includes a collection 210 of resources 110 (e.g., hardware resources 110h), a virtual machine monitor (VMM) 220, a VM layer 240 executing one or more of the VMs 250, and an application layer 260. Each hardware resource 110h may include one or more physical central processing units (pCPU) 204 ("physical processor 204") and memory hardware 206. While each hardware resource 110h is shown having a single physical processor 204, any hardware resource 110h may include multiple physical processors 204. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 204) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212g having a virtual operating platform and manage execution of the corresponding guest OS 212g on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine.

The VM layer 240 includes one or more virtual machines 250. The distributed system 200 enables the user 12 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 200 authorizes and authenticates the user 12 before launching the one or more VMs 250. An instance of software, or simply an instance, refers to a VM 250 hosted on (executing on) the data processing hardware 204 of the distributed system 200.

Each VM 250 may include one or more virtual central processing units (vCPUs) 252 ("virtual processor"). In the example shown, a first virtual machine 250a includes a first set 252a of one or more virtual processors 252 and a second virtual machine 250b includes a second set 252b of one or more virtual processors 252. While the second set 252b is shown as only including one virtual processor 252, any number of virtual processors 252 is possible. Each virtual processor 252 emulates one or more physical processors 204. For example, the first set 252a of the one or more virtual processors 252 emulates a first set 204a of one or more physical processors 204, and the second set 252b of the one or more virtual processors 252 emulates a second set 204b of one or more physical processors 204. The application layer 260 includes software resources 110s, 110sa, 110sb (software applications) that may execute on the virtual machine(s) 250.

Typically, each instance of software (e.g., a virtual machine 250) includes at least one virtual storage device 254 that provides volatile and non-volatile storage capacity for the service on the physical memory hardware 206. For instance, the storage capacity on the physical memory hardware 206 can include persistent disks (PD) that store data for the user 12 across several physical disks (e.g., memory regions 620 (FIG. 6) of the memory hardware 206 or random access memory (RAM) to provide volatile memory. More specifically, each virtual storage device 254 of a corresponding VM 250 moves data in sequences of bytes or bits (blocks) to an associated physical block storage volume V on the memory hardware 206 to provide non-volatile storage. Accordingly, a virtual storage device 254 of a corresponding VM instance 250 provides a storage capacity that maps to corresponding physical block storage volumes V on the memory hardware 206. In some examples, the virtual storage devices 254 support random access to the data on the memory hardware 206 and generally use buffered I/O. Examples include hard disks, CD-ROM drives, and flash drives. Similarly, portions of volatile memory (e.g., RAM) of physical memory hardware 206 may be divided across the virtual storage devices 254.

Within the guest operating system 212g resides a guest kernel 214g. A kernel is a computer program that is the core of the operating system with full access and control over the OS. That is, the kernel is an intermediary between applications 110s and the hardware resources 110h of the host machine. Most modern computing systems segregate virtual memory into protected kernel space and user space 216g. The kernel typically remains in volatile memory within the protected kernel space and is isolated from user space 216g. To increase safety and reliability, applications 110s and other software services typically execute in the guest user space 216g and lack the privileges necessary to interact with the protected kernel space.

Figure 3:
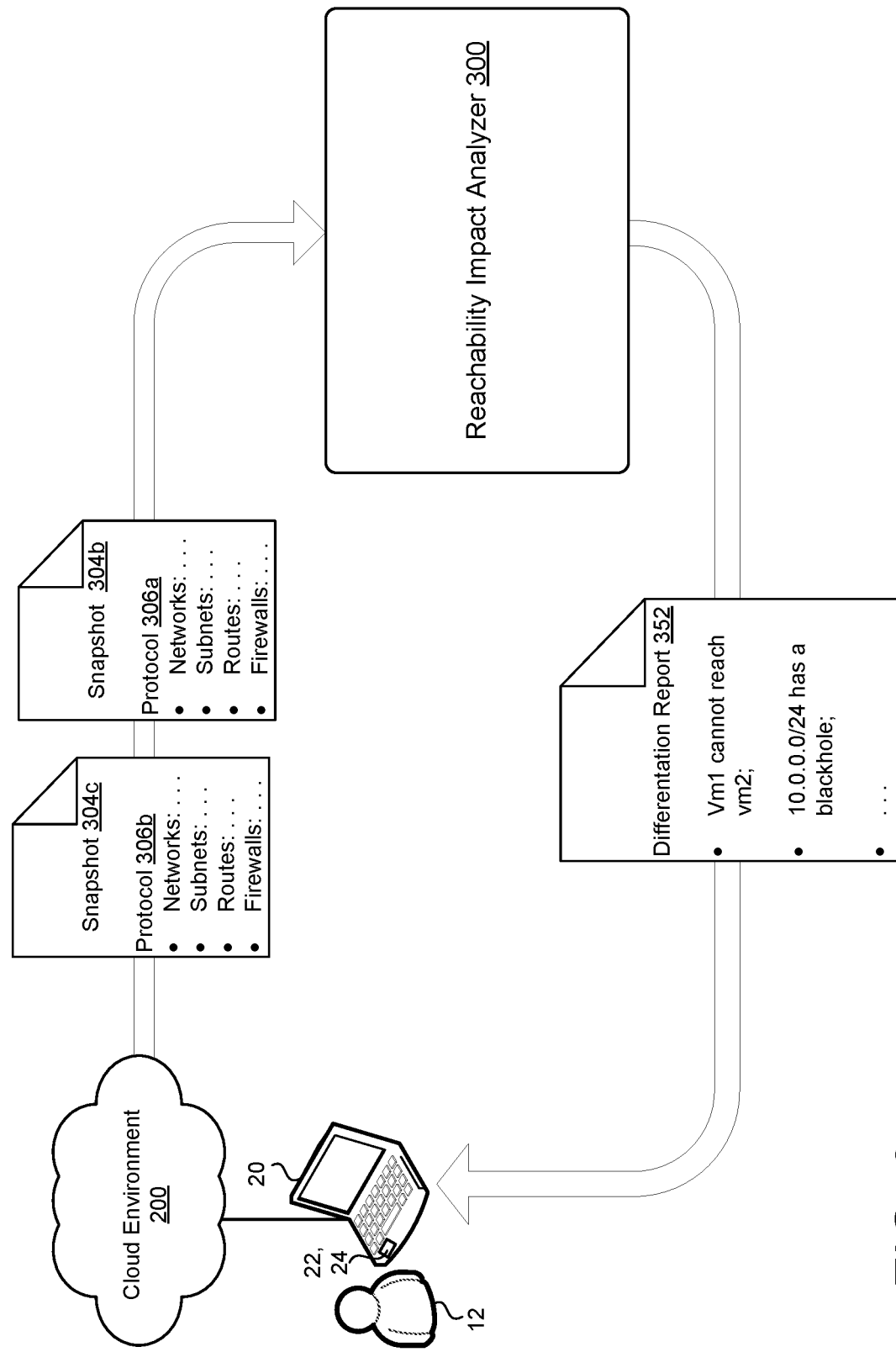
FIG. 3 is a schematic view of an example system for performing network reachability impact analysis.

Referring to FIGS. 1 and 3, the cloud network 200 executes a cloud reachability impact analyzer 300 for analyzing network configuration snapshots 304, 304a-304n of the cloud network 200 to determine differences in packet reachability between two consecutive network configuration snapshots 304, 304a-304n. The cloud reachability impact analyzer 300 then generates a human-interpretable differentiation report 352 identifying the differences in packet reachability between the analyzed configuration snapshots 304 and presents the differentiation report 352 to the user 12 via the user device 20. In some examples, the analyzer 300 determines whether changes to the network 208 result in a policy violation that affects reachability, and localize a configuration stanza responsible for the policy violation.

The cloud reachability impact analyzer 300 continuously receives or obtains the network configuration snapshots 304, 304a-304n from the cloud network 200. The network configuration snapshots 304 are provided by the cloud network 200 in a format of a data plane model protocol 306 including network configuration information. Optionally, the cloud network 200 may execute a data plane modeler 302 that obtains the network configuration information from network components of the VPC 208 and includes, for example, routes between network resources (e.g., VMs, load balances, network gateways, etc.) of the VPC 208, subnets, firewall rules, and/or ports or interfaces for directing a data packet within the VPC 208 and/or between the VPC 208 and other networks (e.g., other VPCs and/or the on-premises network 40).

In FIG. 1, the network configuration snapshots 304 include a first network configuration snapshot 304a including a first data plane model protocol 306a of the VPC 208 at a first time instance, a second network configuration snapshot 304b including the first data plane model protocol 306a of the VPC 208 at a second time instance immediately subsequent to the first time instance, a third network configuration snapshot 304c including a second data plane model protocol 306b of the VPC 208 at a third time instance immediately subsequent to the second time instance, and a plurality of subsequent configuration snapshots 304n including data plane model protocols 306n taken at time instances following the third time instance.

Consecutive ones of the network configuration snapshots 304 may include the same data plane model protocol 306 when the network configuration is not changed from one time instance to the next. For example, in the illustrated example, the first network configuration snapshot 304a and the second network configuration snapshot 304b include the same first data plane model protocol 306a associated with an unchanged network configuration at the first and second time instances. Alternatively, subsequent ones of the network configuration snapshots 304 may include different data plane model protocols 306 when the network configuration is changed between time instances. For example, in FIG. 1, a change 26a, 26b to a configuration or state of the VPC 208 is incorporated between the second network configuration snapshot 304b associated with the second time instance and the third network configuration snapshot 304c associated with the third time instance. Thus, the third network configuration snapshot 304c has a different data plane model protocol 306b than the data plane model protocol 306a of the immediately preceding network configuration snapshot 304b.

Examples of network changes 26a, 26b include a user change 26a implemented by the user 12 via the user device 20 or a system change 26b caused by the cloud network 200. User changes 26a may include pending changes proposed by the user 12 or changes that have already been deployed. System changes 26b may include automated configuration changes incorporated by network monitoring applications and/or network state changes associated with involuntary changes in the VPC 208 (e.g., operation states down). For clarity, the changes 26a, 26b are shown as being incorporated between the illustrated second and third network configuration snapshots 304b, 304c in FIG. 1. However, the actual changes 26a, 26b are implemented within the network 208, upstream up the data plane modeler 302. Thus, the second network configuration snapshot 304b includes the pre-change first data plane model protocol 306a and the third network configuration snapshot 304c includes the post-change second data plane model protocol 306b.

As generally illustrated in FIG. 3, the cloud reachability impact analyzer receives the network configuration snapshots 304b, 304c including the pre-change first data plane model protocol 306a and the post-change second data plane model protocol 306b and generates the human-interpretable differentiation report 352 identifying changes to forwarding behavior between the two network configuration snapshots 304b, 304c. Human-interpretable format includes providing descriptions of the changes to the forwarding behavior using written representations of the differences in network topologies. For example, the differentiation report 352 may include text describing that one of the VMs 250 has become unreachable in the third network configuration snapshot 304c, or that prefix 10.0.0.0/24 goes to a VPN tunnel in the second network configuration snapshot 304b and to a subnet in the third network configuration snapshot 304c.

With continued reference to FIG. 1, the cloud reachability impact analyzer 300 includes an optional snapshot selector 310 configured to extract consecutive network configuration snapshots 304 from the data plane modeler 302. The cloud reachability impact analyzer 300 also includes a packet equivalence classifier 320 that computes packet equivalences for each of the selected consecutive network configuration snapshots 304. The cloud reachability impact analyzer 300 further includes a graph generator 330 that creates a reachability graph 332a, 332b corresponding to each of the selected network configuration snapshots 304. A graph analyzer 340 receives and compares the reachability graphs 332a, 332b to generate a differentiation graph 342. The cloud reachability impact analyzer 300 further includes a graph interpreter 350 that evaluates the differentiation graph 342 and generates the human-interpretable differentiation report 352.

Figure 4:
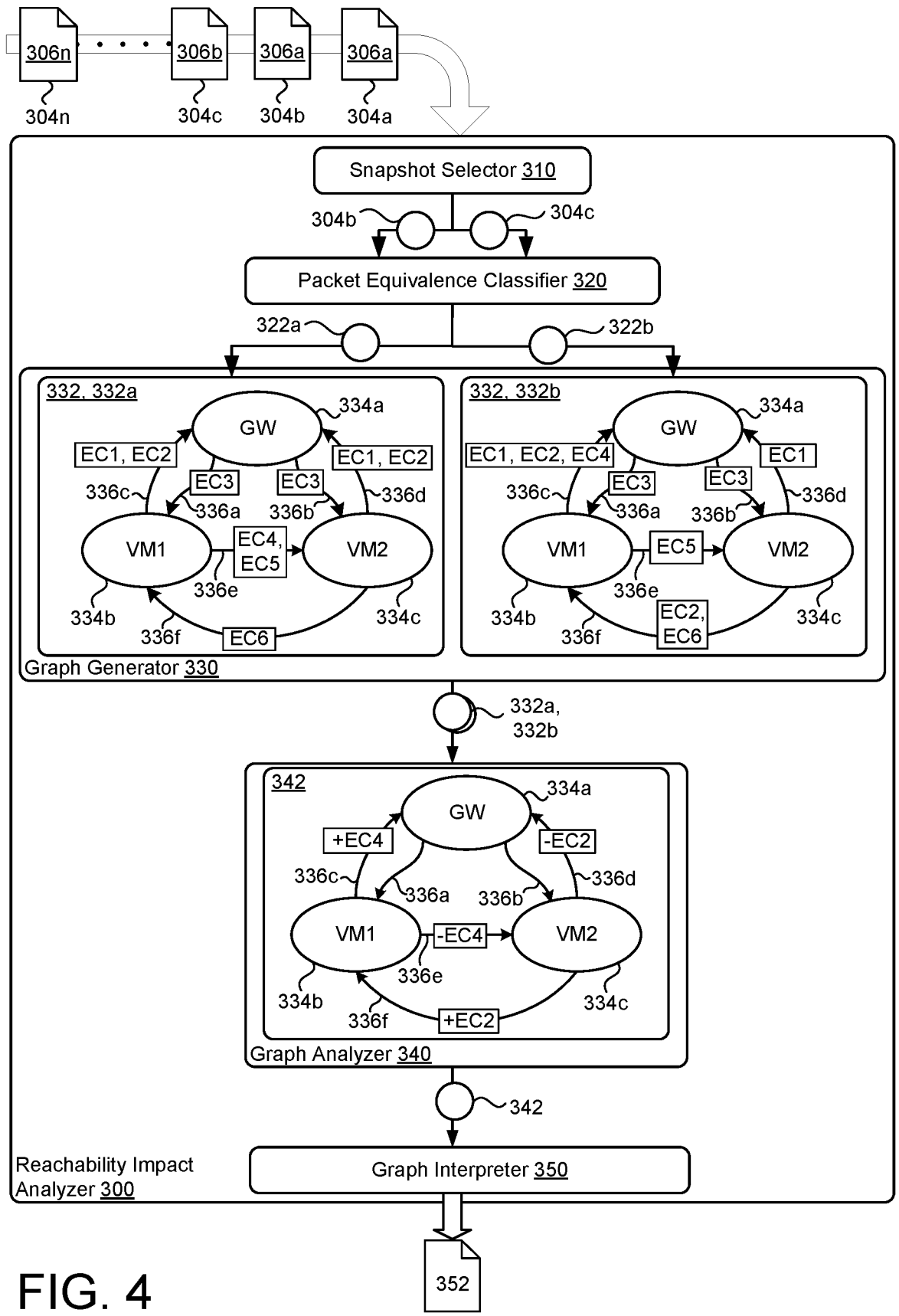
FIG. 4 is a schematic view of an example system for performing network reachability impact analysis.

FIG. 4 shows a more detailed schematic illustrating the configuration and operation of the cloud reachability impact analyzer 300. As previously discussed, the cloud reachability impact analyzer 300 receives or obtains a continuous feed of the network configuration snapshots 304 from the cloud network 200. More specifically, when included, the snapshot selector 310 continuously receives and compares the network configuration snapshots 304 to determine when one or more changes 26a, 26b have been implemented in the VPC 208. Thus, in the example shown, the snapshot selector 310 executes a first comparison between the first network configuration snapshot 304a and the second network configuration snapshot 304b and does not determine that any changes 26a, 26b have been implemented, as both snapshots 304a, 304b include the same data plane model protocol 306a. Subsequently, the snapshot selector 310 executes a second comparison between the second network configuration snapshot 304b and the third network configuration snapshot 304c and identifies that the one or more changes 26a, 26b have been implemented in the third network configuration snapshot 304c where the second network configuration snapshot 304b includes a different data plane model protocol 306a than the data plan model protocol 306b of the third network configuration snapshot 304c. The snapshot selector 310 then selects the second network configuration snapshot 304b immediately preceding the change 26a, 26b and the third network configuration snapshot 304c including the change 26a, 26b.

While the snapshot selector 310 may automatically select the network configuration snapshots 304, as described here, in other examples the snapshot selector 310 may receive instructions for selecting the network configuration snapshots 304b, 304c from the user device 20 or the cloud network 200 in conjunction with one of the changes 26a, 26b being implemented. For instance, the user 12 or the cloud network 200 may provide instructions to the snapshot selector 310 including information identifying the consecutive network configuration snapshots 304b, 304c and/or the time instances associated with the change 26a, 26b.

The packet equivalence classifier 320 receives the selected network configuration snapshots 304b, 304c from the snapshot selector 310 and computes packet equivalence classes for each of the network configuration snapshots 304b, 304c. A packet equivalence class EC, EC1-EC6 represents a set of packets that have the same forwarding behavior with respect to all configuration rules of both of the network configuration snapshots 304b, 304c. For example, the illustrated examples of the network configuration snapshots 304b, 304c include a total of six of the equivalence classes EC1-EC6. Optionally, the packet equivalence classifier 320 may compile the computed equivalence classes EC1-EC6 into a first subgroup 322a associated with the second network configuration snapshot 304b and a second subgroup 322b associated with the third network configuration snapshot 304c.

The graph generator 330 receives the equivalence class subgroups 322a, 322b including the computed equivalence classes EC1-EC6 and builds reachability graphs 332a, 332b representing routing of the equivalence classes EC1-EC6 relative to the network topologies associated with each of the respective network configuration snapshots 304b, 304c. As shown, each of the reachability graphs 332a, 332b includes a directed graph 332 having a plurality of nodes 334, 334a-334c and edges 336, 336a-336f. Each of the nodes 334 represents a network endpoint associated with a network resource, such as a VM 250 or a network gateway 42. Each of the edges 336 represents a forwarding route from one of the nodes 334 to another one of the nodes 334. In the illustrated example, the network reachability graphs 332a, 332b each represent a network topology including a gateway node 334a, a first VM node 334b, and a second VM node 334c.

Each node 334a-334c is connected each other node 334a-334c by an edge 336a-336f representing a forwarding route from one endpoint to another. A first edge 336a represents a forwarding route from the gateway node 334a to the first VM node 334b, a second edge 336b represents a forwarding route from the gateway node 334a to the second VM node 334c, a third edge 336c represents a forwarding route from the first VM node 334b to the gateway node 334a, a fourth edge 336d represents a forwarding route from the second VM node 334c to the gateway node 334a, a fifth edge 336e represents a forwarding route from the first VM node 334b to the second VM node 334c, and a sixth edge 336f represents a forwarding route from the second VM node 334c to the first VM node 334b.

The graph generator 330 uses the reachability graphs 332a, 332b to model which of the equivalence classes EC1-EC6 are allowed to travel through each edge for each reachability graph 332a, 332b. Thus, as shown, the graph generator 330 assigns each of the equivalence classes EC1-EC6 to respective ones of the edges 336a-336f that the equivalence class EC1-EC6 is allowed to travel along. Here, assignments are illustrated by labeling each edge 336a-336c with the corresponding equivalence classes EC1-EC6 that are allowed to travel along the edge 336a-336c.

The reachability graphs 332a, 332b created by the graph generator 330 are forwarded to the graph analyzer 340, which evaluates the reachability graphs 332a, 332b to determine an impact to reachability between the two reachability graphs 332a, 332b. In other words, the graph analyzer 340 compares the reachability graphs 332a, 332b to identify differences in reachability between each of the nodes 334a-334c caused by implementing the changes 26a, 26b. The graph analyzer 340 models the reachability impact as a differentiation graph 342 including the same nodes 334a-334c and edges 336a-336f as the reachability graphs 332a, 332b. The reachability impact analyzer 340 then computes a net change (e.g., addition/removal of equivalence classes) for each edge 336a-336f to determine the impact to reachability from the second network configuration snapshot 304b to the third network configuration snapshot 304c.

In the illustrated example, the differentiation graph 342 shows that reachability along the first and second edges 336a, 336b corresponding to the forwarding paths from the gateway node 334a to each of the VM nodes 334b, 334c is unchanged between the first reachability graph 332a and the second reachability graph 332b. However, the differentiation graph 342 shows that the remaining edges 336c-336f each include changes corresponding to added or removed allowances of equivalence classes EC1-EC6. Particularly, the fourth equivalence class EC4 is added +EC4 to the third edge 336c and removed −EC4 from the fifth edge 336e, representing that the fourth equivalence class EC4 can now travel to (i.e., reach) the gateway node 334a from the first VM node 334b, but cannot travel to (i.e., reach) the second VM node 336c from the first VM node 334b. Additionally, the second equivalence class EC2 is added +EC2 to the sixth edge 336f and deleted from the fourth edge 336d, representing that the second equivalence class EC2 is allowed to travel to (i.e., reach) the first VM node 334b from the second VM node 334c and cannot traveling to (i.e., reach) the gateway node 334a from the second VM node 334c.

In some examples, the graph interpreter 350 receives the differentiation graph 342 from the graph analyzer 340 and translates the graphical representation of the reachability changes +/−EC2, +/−EC4 into the human-interpretable differentiation report 352. For example, the graph interpreter 350 translates the reachability changes +/−EC2, +/−EC4 of the directed graph into a text-based differentiation report 352 identifying the impact of the changes 26a, 26b on reachability. In some examples, the graph interpreter 350 analyzes the reachability changes +/−EC2, +/−EC4 relative to one or more network intentions identified by the user 12. Here, the graph interpreter 350 may highlight or identify specific ones of the reachability changes +/−EC2, +/−EC4 that will impact the user intention for the network.

Using the differentiation report 352, a network user 12 can determine whether changes 26a, 26b to a network topology of a VPC 208 should be implemented. Where the impact on reachability is unintended and/or unacceptable, the user 12 may decline the changes 26a, 26b or revert the network configuration to a state prior to the change 26a, 26b. In some instances, the reachability impact analyzer 300 may be implemented in conjunction with a network change simulator to model and analyze reachability impact prior to the change 26a, 26b being implemented on the production VPC 208.

Figure 5:
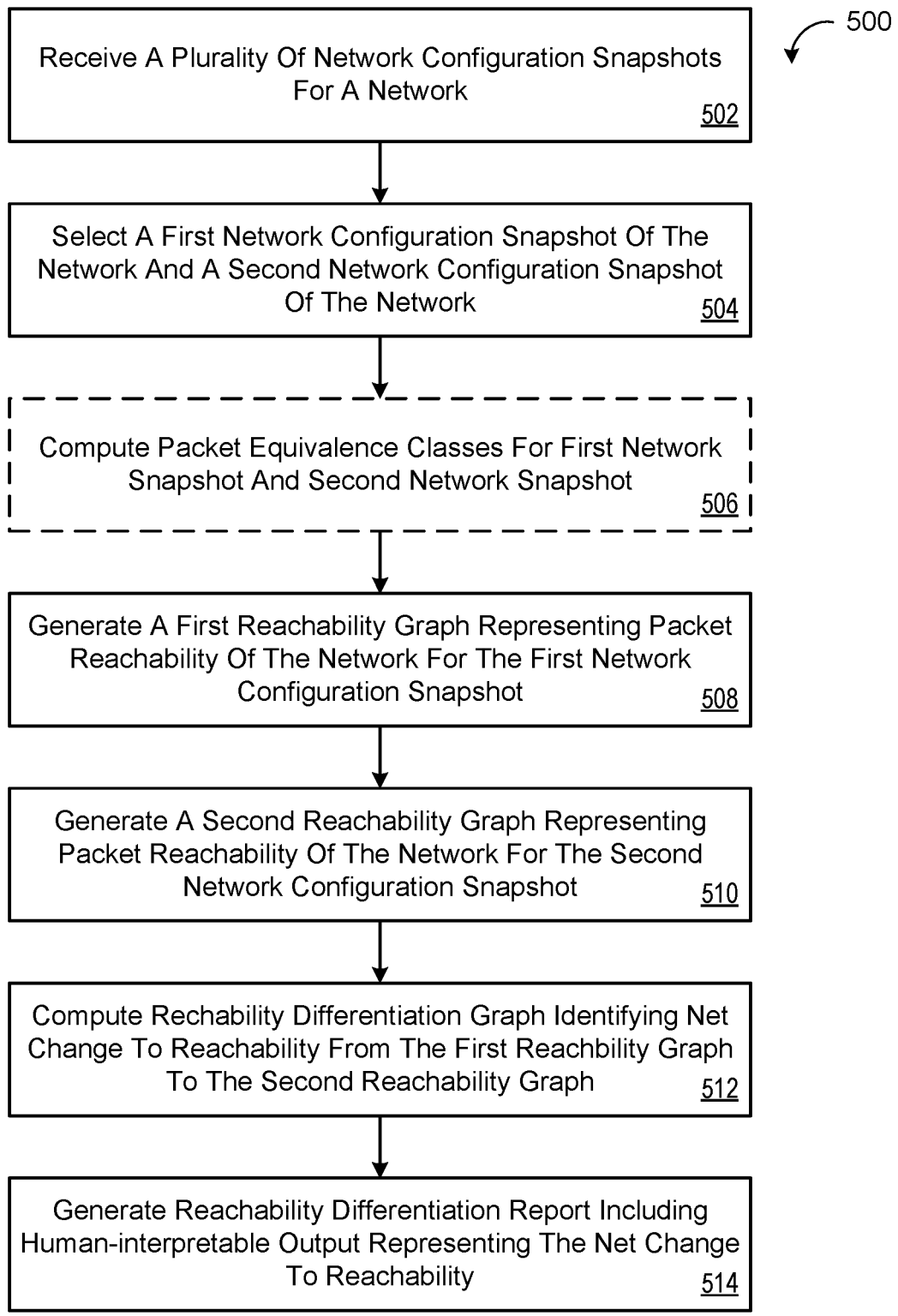
FIG. 5 is a flowchart of an example arrangement of operations for a method of performing cloud network reachability analysis.

FIG. 5 is a flowchart of an exemplary arrangement of operations for a method 500 of performing cloud network reachability impact analysis. The method 500 includes, at operation 502, receiving, at data processing hardware 202, a plurality of network configuration snapshots 304, 304a-304n for a network 208. Optionally, the network configuration snapshots 304, 304a-304n include data plane model protocols 306, 306a-306n. At operation 504, the method 500 includes selecting a first network configuration snapshot 304b and a second network configuration snapshot 304c of the network 208. The method 500 may also include computing, at operation 506, packet equivalence classes for each of the first network snapshot and the second network snapshot. The method 500 also includes, at operation 508, generating a first reachability graph 332a representing packet reachability of the network 208 for the first network configuration snapshot 304b. At operation 510, the method 500 includes generating a second reachability graph 332b representing packet reachability of the network 208 for the second network configuration snapshot 304c. The method 500 also includes, at operation 512, computing a reachability differentiation graph 342 that identifies net change to reachability from the first reachability graph 332a to the second reachability graph 332b. At operation 514, the method 500 includes generating a differentiation report 352 including human-interpretable output representing a net change to reachability.

Figure 6:
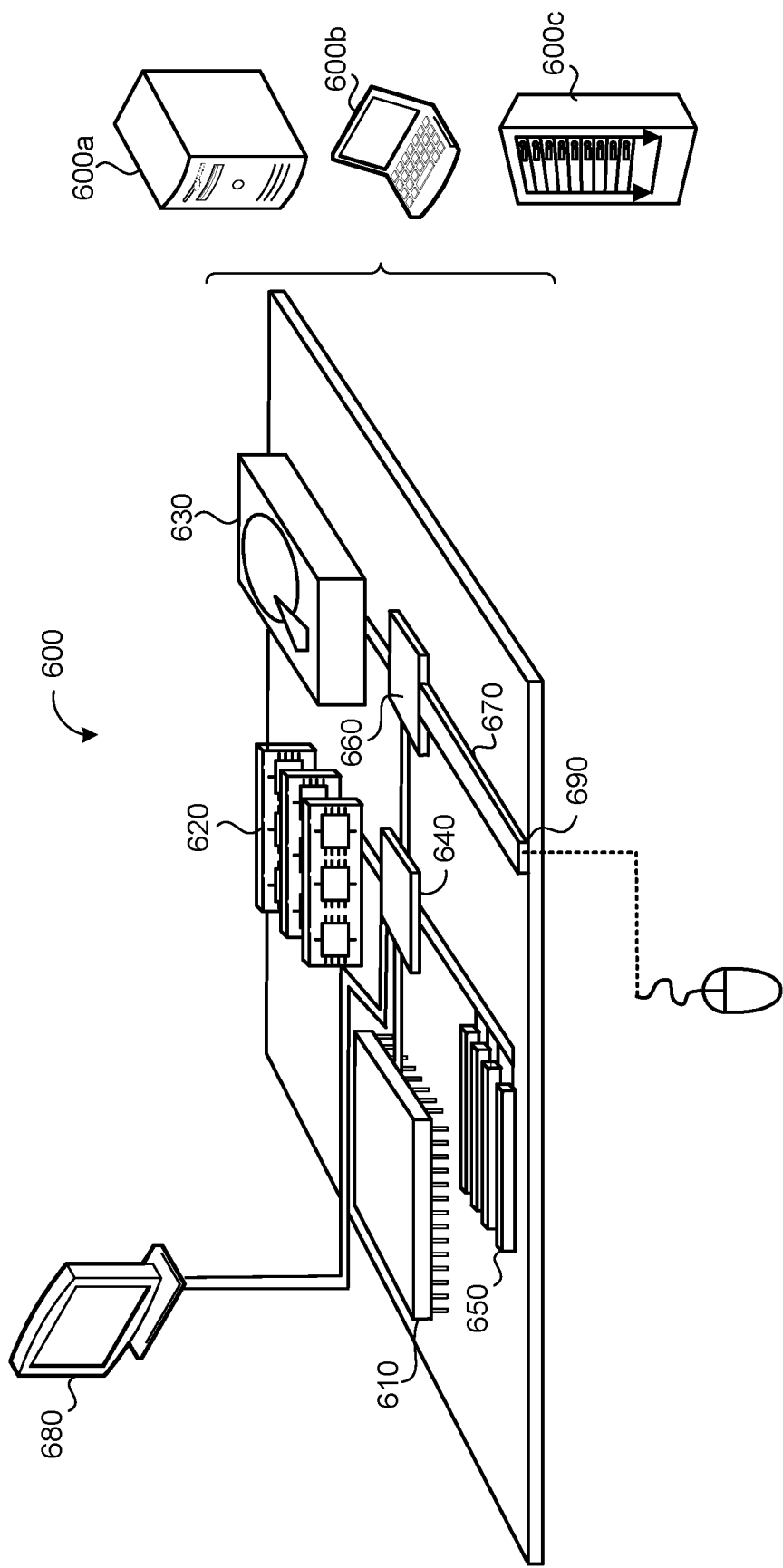
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining a stream of consecutive network configuration snapshots for a network, each network configuration snapshot of the stream of consecutive network configuration snapshots comprising network configuration information, the network establishing digital communication between a plurality of network endpoints;
    determining that first network configuration information of a first network configuration snapshot of the network from the stream of consecutive network configuration snapshots for the network is the same as second network configuration information of a second network configuration snapshot of the network from the stream of consecutive network configuration snapshots for the network, the second network configuration snapshot of the network consecutive with the first network configuration snapshot in the stream of consecutive network configuration snapshots for the network;
    after determining that the first network configuration information is the same as the second network configuration information, determining that the second network configuration information of the second network configuration snapshot of the network from the stream of consecutive network configuration snapshots for the network is not the same as third network configuration information of a third network configuration snapshot of the network from the stream of consecutive network configuration snapshots for the network, the third network configuration snapshot of the network consecutive with the second network configuration snapshot in the stream of consecutive network configuration snapshots for the network;
    determining, based on a difference in packet reachability of the network during the second network configuration snapshot and packet reachability of the network during the third network configuration snapshot, a net change in reachability for the network;
    determining, based on the net change in reachability for the network, a policy violation affecting reachability of the network present in the third network configuration snapshot;
    generating a reachability differentiation report including the policy violation;
    after generating the reachability differentiation report, reverting a configuration of the network to a state corresponding to the first network configuration information; and
    implementing the network using the reverted configuration for digital communication between the plurality of network endpoints.

2. The method of claim 1, wherein generating the reachability differentiation report comprises translating the policy violation from a computer-interpretable format to a human-interpretable output.

3. The method of claim 1, wherein each network configuration snapshot of the stream of consecutive network configuration snapshots comprises a data plane model protocol taken at a respective time instance.

4. The method of claim 3, wherein determining that first network configuration information of the first network configuration snapshot of the network is the same as second network configuration information of the second network configuration snapshot of the network comprises determining that the data plane model protocol of the first network configuration snapshot of the network is the same as the data plane model protocol of the second network configuration snapshot of the network.

5. The method of claim 1, wherein the operations further comprise:
    determining that the third network configuration information of the third network configuration snapshot of the network from the stream of consecutive network configuration snapshots for the network is the same as fourth network configuration information of a fourth network configuration snapshot of the network from the stream of consecutive network configuration snapshots for the network, the fourth network configuration snapshot of the network consecutive with the third network configuration snapshot in the stream of consecutive network configuration snapshots for the network; and
    determining, based on determining that the third network configuration information of the third network configuration snapshot of the network is the same as the fourth network configuration information of the fourth network configuration snapshot of the network, that the network is unchanged between the third network configuration snapshot and the fourth network configuration snapshot.

6. The method of claim 1, wherein the operations further comprise determining:
    a first one or more packet equivalence classes for the first network configuration snapshot;
    a second one or more packet equivalence classes for the second network configuration snapshot; and
    a third one or more packet equivalence classes for the third network configuration snapshot,
    wherein each packet equivalence class comprises a set of packets having the same forwarding behavior.

7. The method of claim 6, wherein the operations further comprise:
    assigning the second one or more packet equivalence classes for the second network configuration snapshot to the second network configuration information; and assigning the third one or more packet equivalence classes for the third network configuration snapshot to the third network configuration information.

8. The method of claim 7, wherein determining the net change in reachability for the network includes identifying a net change to network equivalence classes between the second network configuration information and the third network configuration information.

9. The method of claim 1, wherein the operations further comprise localizing a configuration stanza responsible for the policy violation.

10. The method of claim 9, wherein the reachability differentiation report includes the localized configuration stanza responsible for the policy violation.

11. A system comprising:
data processing hardware; and
memory hardware in communication with the data processing hardware, the memory hardware storing instructions that are executed on the data processing hardware and cause the data processing hardware to perform operations comprising:
  obtaining a stream of consecutive network configuration snapshots for a network, each network configuration snapshot of the stream of consecutive network configuration snapshots comprising network configuration information, the network establishing digital communication between a plurality of network endpoints;
  determining that first network configuration information of a first network configuration snapshot of the network from the stream of consecutive network configuration snapshots for the network is the same as second network configuration information of a second network configuration snapshot of the network from the stream of consecutive network configuration snapshots for the network, the second network configuration snapshot of the network consecutive with the first network configuration snapshot in the stream of consecutive network configuration snapshots for the network;
  after determining that the first network configuration information is the same as the second network configuration information, determining that the second network configuration information of the second network configuration snapshot of the network from the stream of consecutive network configuration snapshots for the network is not the same as third network configuration information of a third network configuration snapshot of the network from the stream of consecutive network configuration snapshots for the network, the third network configuration snapshot of the network consecutive with the second network configuration snapshot in the stream of consecutive network configuration snapshots for the network;
  determining, based on a difference in packet reachability of the network during the second network configuration snapshot and packet reachability of the network during the third network configuration snapshot, a net change in reachability for the network;
  determining, based on the net change in reachability for the network, a policy violation affecting reachability of the network present in the third network configuration snapshot;
  generating a reachability differentiation report including the policy violation;
  after generating the reachability differentiation report, reverting a configuration of the network to a state corresponding to the first network configuration information; and
  implementing the network using the reverted configuration for digital communication between the plurality of network endpoints.

12. The system of claim 11, wherein generating the reachability differentiation report comprises translating the policy violation from a computer-interpretable format to a human-interpretable output.

13. The system of claim 11, wherein each network configuration snapshot of the stream of consecutive network configuration snapshots comprises a data plane model protocol taken at a respective time instance.

14. The system of claim 13, wherein determining that first network configuration information of the first network configuration snapshot of the network is the same as second network configuration information of the second network configuration snapshot of the network comprises determining that the data plane model protocol of the first network configuration snapshot of the network is the same as the data plane model protocol of the second network configuration snapshot of the network.

15. The system of claim 11, wherein the operations further comprise:
  determining that the third network configuration information of the third network configuration snapshot of the network from the stream of consecutive network configuration snapshots for the network is the same as fourth network configuration information of a fourth network configuration snapshot of the network from the stream of consecutive network configuration snapshots for the network, the fourth network configuration snapshot of the network consecutive with the third network configuration snapshot in the stream of consecutive network configuration snapshots for the network; and
  determining, based on determining that the third network configuration information of the third network configuration snapshot of the network is the same as the fourth network configuration information of the fourth network configuration snapshot of the network, that the network is unchanged between the third network configuration snapshot and the fourth network configuration snapshot.

16. The system of claim 11, wherein the operations further comprise determining:
  a first one or more packet equivalence classes for the first network configuration snapshot;
  a second one or more packet equivalence classes for the second network configuration snapshot; and
  a third one or more packet equivalence classes for the third network configuration snapshot,
  wherein each packet equivalence class comprises a set of packets having the same forwarding behavior.

17. The system of claim 16, wherein the operations further comprise:
  assigning the second one or more packet equivalence classes for the second network configuration snapshot to the second network configuration information; and
  assigning the third one or more packet equivalence classes for the third network configuration snapshot to the third network configuration information.

18. The system of claim 17, wherein determining the net change in reachability for the network includes identifying a net change to network equivalence classes between the second network configuration information and the third network configuration information.

19. The system of claim 11, wherein the operations further comprise localizing a configuration stanza responsible for the policy violation.

20. The system of claim 19, wherein the reachability differentiation report includes the localized configuration stanza responsible for the policy violation.

* * * * *